United States Patent [19]

Finn

[11] Patent Number: 4,583,657

[45] Date of Patent: Apr. 22, 1986

[54] ADAPTER FOR A PACKAGE DISPENSING MACHINE

[75] Inventor: Everett N. Finn, Louisville, Ky.

[73] Assignee: Brown & Williamson Tobacco Corporation, Louisville, Ky.

[21] Appl. No.: 628,105

[22] Filed: Jul. 5, 1984

[51] Int. Cl.[4] .............................................. B65G 59/00

[52] U.S. Cl. .................................... 221/199; 221/227; 221/241

[58] Field of Search ............... 221/241, 242, 199, 131, 221/103, 107, 108, 111, 133, 279, 226, 227, 20, 44, 52, 56, 65, 304, 281; 194/2

[56] References Cited

U.S. PATENT DOCUMENTS

| | | | |
|---|---|---|---|
| 725,317 | 4/1903 | Cody | 221/108 X |
| 2,585,872 | 2/1952 | Steiner | 221/242 X |
| 3,282,466 | 11/1966 | Meresz et al. | 221/242 X |
| 3,871,059 | 3/1975 | Goldenstein | 221/242 X |
| 4,334,634 | 6/1982 | Fernandez et al. | 221/241 X |

FOREIGN PATENT DOCUMENTS

| | | | |
|---|---|---|---|
| 476298 | 12/1974 | Australia | 221/242 |

*Primary Examiner*—Joseph J. Rolla
*Assistant Examiner*—Kevin P. Shaver
*Attorney, Agent, or Firm*—Charles G. Lamb

[57] ABSTRACT

An adapter device for a cigarette package dispensing machine for modifying the dispensing machine to contain and dispense smaller sized packages than the dispensing machine was originally designed to contain and dispense. Typical cigarette dispensing machines include a plurality of package column support structures for supporting two adjacent front to back ranks of columns of stacked cigarette packages of a predetermined size. Each column support structure includes a movable package column pusher plate for moving the back most column of packages to the front of the column support structure when the front most column of packages has been depleted. The adapter device includes a fixed position spacer panel located at one side wall of the column support structure to effectively narrow the support structure by an amount generally equal to the difference in width between the larger sized predetermined packages for which the dispensing machine was designed and the smaller sized packages, and a package column slide structure for holding the back most column of smaller sized packages, the column slide structure being attached to the package column pusher plate for movement therewith when the front most column of smaller sized packages has been depleted.

1 Claim, 7 Drawing Figures

ADAPTER FOR A PACKAGE DISPENSING MACHINE

BACKGROUND OF THE INVENTION

The present invention relates to package dispensing machines, and more particularly to an adapter device for cigarette package dispensing machines for modifying existing package dispensing machines to contain and dispense smaller packages than the dispensing machine was originally constructed to contain and dispense.

Most cigarette package dispensing machines are designed and constructed to contain and dispense cigarette packages of a predetermined size and configuration such as, for example, packages containing twenty cigarettes. Typically, cigarette packages containing twenty cigarettes are about 2-5/32 inches wide and about $\frac{5}{8}$ of an inch in thickness. The length or height of a twenty cigarette package is a function of the length of the cigarette. For example, the height of a package containing regular sized cigarettes is about $3\frac{1}{4}$ inches, and the height of a package containing "king sized" cigarettes is about 4 inches.

It is contemplated that a market exists for cigarette packages containing fewer than twenty cigarettes, for example, cigarette packages containing ten cigarettes. Of course, cigarette packages containing fewer than twenty cigarettes are smaller in width and thickness than twenty cigarette packages. It is realized that a substantial portion of the market for cigarettes is machine dispensed sales of cigarettes. However, presently there is no knowledge of the existence of cigarette package dispensing machines for storing and dispensing cigarette packages smaller than the conventionally sized twenty cigarette packages. And, it would be an extremely expensive task to add additional cigarette dispensing machines for storing and dispensing smaller cigarette packages to supplement the presently used twenty cigarette package dispensers. Therefore, a need exists for an adapter device for converting existing cigarette package dispensing machines to store and dispense cigarette packages of a smaller size than the conventional twenty cigarette packages. Such an adapter must be relatively inexpensive to manufacture, must be capable of being installed quickly and easily in existing cigarette package dispensing machines, and must be capable of being installed without modification of any of the components of the existing cigarette package dispensing machine.

SUMMARY OF THE INVENTION

The present invention recognizes the need for such an adapter device and the requirements therefore mentioned above.

More particularly, the present invention provides in a cigarette package dispensing machine of the type having at least one package column support housing for supporting two adjacent front to back ranks of columns of stacked cigarette packages of a predetermined size, the package column support housing including two spaced apart, parallel side walls, a back wall generally perpendicular to and interconnecting the side walls, an open front defined by the free edges of the side walls opposite the back wall, and an open bottom through which packages exit the column support housing one at a time, a movable package column pusher plate generally coextensive with and located generally parallel to the housing back wall, and means for biasing the movable plate in a direction away from the housing back wall toward the open front of the column support housing, the improvement of an adapter device for adapting the package column support housing to support packages of a smaller size than the predetermined package size comprising a fixed position spacer panel adapted to be located in generally parallel, spaced relationship to a portion of one side wall of the column support housing, the spacer panel vertically extending substantially the entire height of the support housing side wall and extending horizontally from the free front edge of the support housing side wall toward the housing back wall a distance substantially corresponding to the front to back dimension of a column of packages to be supported in the housing, and the distance by which the spacer panel is spaced from the support housing side wall being substantially equal to the difference in width of the packages of predetermined size and the packages of smaller size; means for attaching the spacer panel in a fixed position to the column support housing; a package column slide structure adapted to be slidably received within the column support housing, the slide structure having at least one side wall positioned in generally parallel relationship to the housing side wall having the spacer panel, the slide structure side wall being spaced from the housing side wall having the spacer panel by a distance greater than the distance by which the spacer panel is spaced from the same housing side wall, and a back wall generally perpendicular to the slide structure side wall and located in parallel overlaying relationship to the pusher plate; and means for attaching the package column slide structure to the pusher plate so that the package column slide structure moves with the pusher plate.

BRIEF DESCRIPTION OF THE DRAWINGS

The present invention will become even more clear upon reference to the following description in conjunction with the accompanying drawings wherein like numerals refer to like parts and in which.

DETAILED DESCRIPTION

Figure 1:
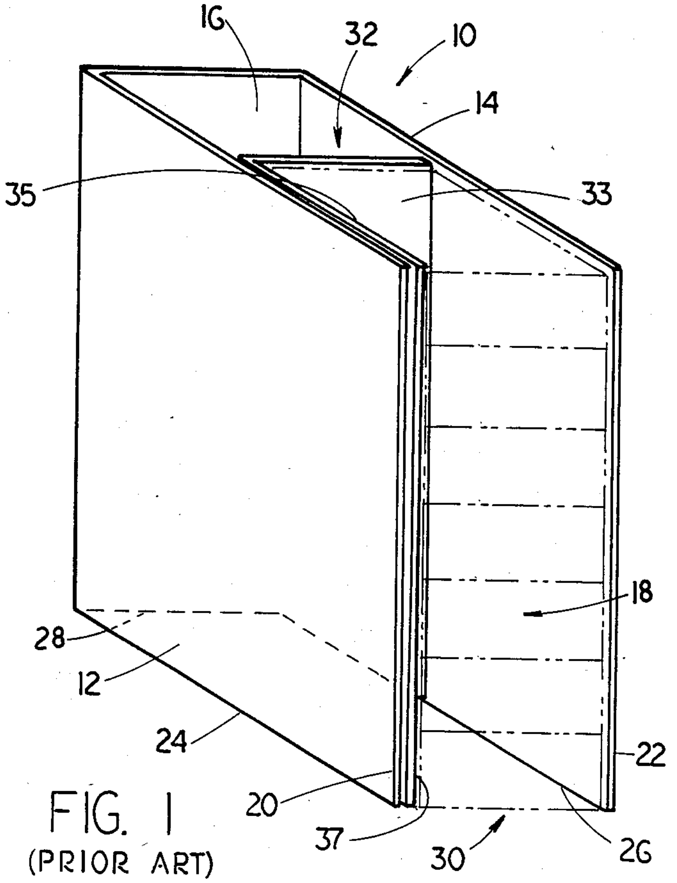
FIG. 1 (PRIOR ART)
FIG. 1 is a perspective view of a typical prior art package column support housing used in cigarette package dispensing machines.
Figure 2:
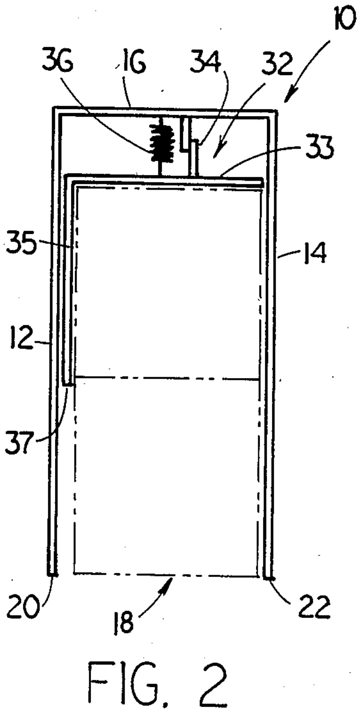
FIG. 2 (PRIOR ART)
FIG. 2 is a top view of the package column support housing of FIG. 1 illustrating a component thereof in a first position.
Figure 3:
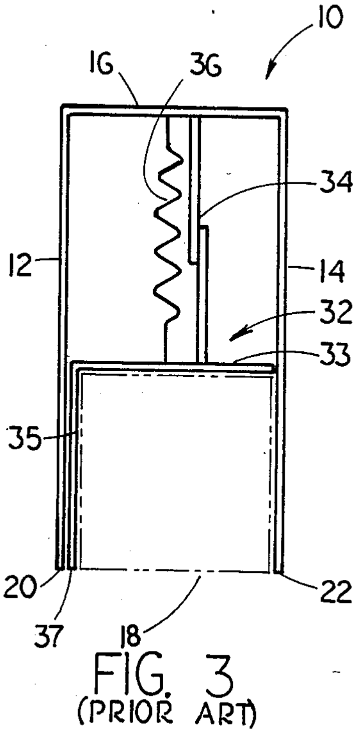
FIG. 3 (PRIOR ART)
FIG. 3 is a top view of the package column support housing of FIG. 1 illustrating a component thereof in a second position.

First with reference to FIGS. 1-3, there is shown a typical package column support housing, generally denoted as the numeral 10, for use in a conventional cigarette package dispensing machine (not shown). Most usually, a cigarette package dispensing machine comprises a plurality of these package column support housings, for example, one for each brand being sold in the machine. Each package column support housing 10 supports two adjacent front to back ranks of columns of stacked cigarette packages of a predetermined size as indicated by the phantom lines in FIGS. 1–3.

With continued reference to FIGS. 1–3, the package column support housing 10 includes two spaced, parallel side walls 12 and 14, and a back wall 16 generally perpendicular to and interconnecting the side walls 12 and 14. An open front area 18 is defined by the vertical free edges 20 and 22 of the side walls 12 and 14, respectively, opposite the back wall 16. The bottom edges 24 and 26 of the side walls 12 and 14, respectively, and the bottom edge 28 of the back wall 16 define an open bottom 30 through which cigarette packages exit the column support housing 10 one at a time. The side walls 12 and 14, and back wall 16 can be fabricated of a rigid material such as sheet metal. Further, a movable package column pusher 32 is within the column support housing 10 and is mounted for movement from the back wall 16 (see FIG. 2) toward the open front area 18 (see FIG. 3). The column pusher 32 is shown as including an elongated back plate 33 and a side plate 35 extending at a right angle from the back plate 33. The back plate 33 is generally coextensive with and generally parallel to the housing back wall 16, and the side plate 35 overlays a portion of one side wall, for example, side wall 12 of the column support housing 10. The distance from the vertical free front edge 37 of the side plate 35 to the back plate 33 is approximately the same as the front to back dimension of a column of cigarette packages. The pusher 32 can be movably mounted by virtually any type of convenient mechanism such as, for example, a toggle arrangement 34 interconnecting the housing back wall 16 and pusher back plate 33, and the pusher 32 is biased toward the open front area 18 by means of, for example, a compression spring 36.

In operation (as can be clearly seen by comparing FIG. 2 to FIG. 3), when the front column of cigarette packages has been depleted, the pusher 32 moves the rear column of cigarette packages to the position vacated by the front column of cigarette packages at the open front area 18 of the column support housing 10. The pusher plate 32 is moved toward the open front area 18 of the package column support structure 10 by the toggle arrangement 34 and biasing spring 36.

With reference to FIGS. 4–7, there is shown an adapter device, generally denoted as the numeral 38, of the present invention. The adapter device 38 comprises a fixed position spacer panel, generally denoted as the numeral 40, and a package column slide structure 42. With continued reference to FIGS. 4–6, the fixed position spacer panel 40 is vertically located over a portion of one of the side walls 14 of the package support housing 10, for example, the side wall 14. The spacer panel 40 has a front edge at the front free edge of the housing side wall 14, and extends from the front free edge 22 of the side wall 14 toward the back wall 16 of the column support structure 10 a distance approximately equal to the front to back dimension of a column of cigarette packages where it terminates at a back edge, and extends vertically substantially the entire height of the support structure side wall 14. Further, the vertical elongated panel 40 is spaced from the support structure side wall 14 by a distance substantially equal to the difference in width of the packages of predetermined size and the packages of smaller size. Toward this end, the elongated panel 40 includes a spacing flange 46 formed at the vertical front edge of the panel 40 in alignment with the vertical free front edge 22 of the support structure side wall 14. The spacing flange 46 abuts the side wall 14 next to the front edge 22 thereof holding the panel 40 away from the side wall 14 by the thickness dimension of the spacer flange 46. The vertical elongated panel 40 is affixed in place by means of an elongated bracket 48 which is attached at one of its ends to the panel 40 and attached at the other of its ends to, for example, the column support structure side wall 14 near the intersection of the side wall 14 and the support structure back wall 16. The attachment of the bracket 48 to the side wall 14 can be accomplished by, for example, a machine screw or rivet 50.

Figure 4:
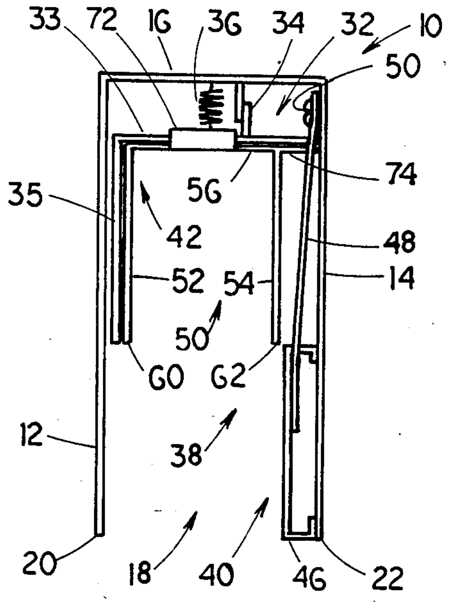
FIG. 4 is a top view of the package column support housing of FIG. 1 including the adapter device of the present invention in a first position.
Figure 5:
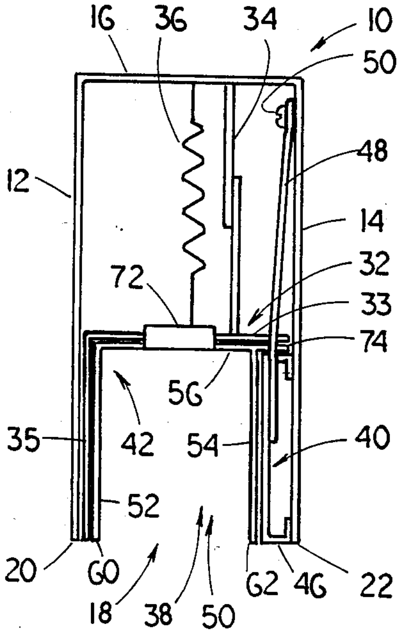
FIG. 5 is a top view of the package column support housing of FIG. 1 including the adaptor device of the present invention in a second position.
Figure 7:
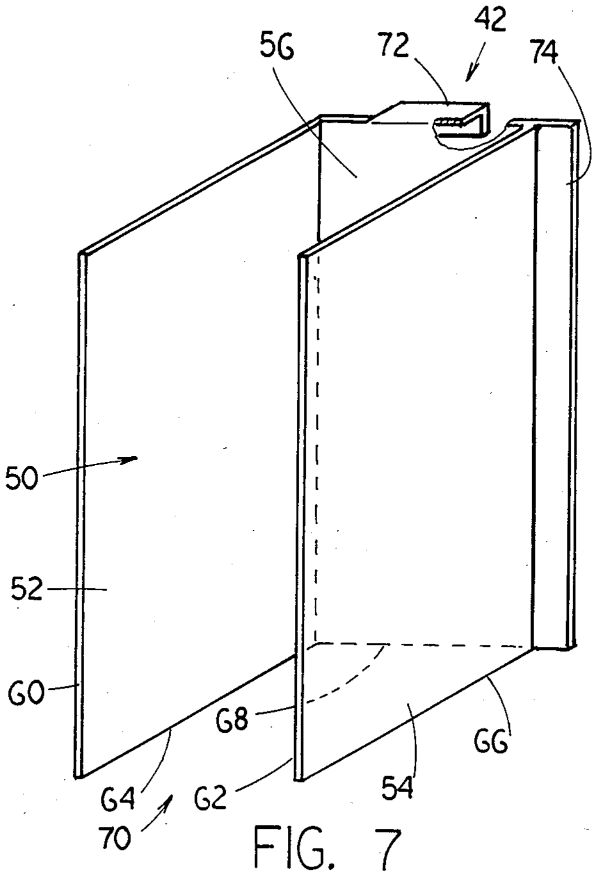
FIG. 7 is a perspective view of the package column slide structure of the adapter device.
Figure 6:
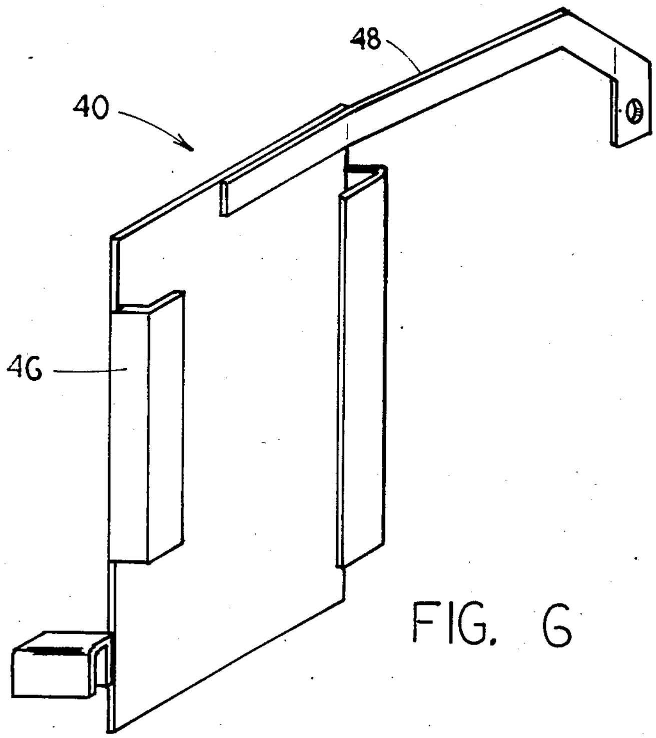
FIG. 6 is a perspective view of the spacer panel of the adapter device.

With continued reference to FIGS. 4, 5 and 7, the package column slide structure 42 includes two spaced side walls 52 and 54, and a back wall 56 generally perpendicular to and interconnecting the side walls 52 and 54. An open front area 50 is defined by the vertical free edges 60 and 62 of the side walls 52 and 54, respectively, opposite the back wall 56. The bottom edges 64 and 66 of the side walls 52 and 54, respectively, and the bottom edge 68 of the back wall 56 define an open bottom 70 through which cigarette packages exit the package column slide structure 42 one at a time. The width or space between the side walls 52 and 54 is less than the width of the column support housing 10 between the side walls 12 and 14, and is generally equal to the width of the packages of smaller size. The horizontal distance from the free front edges 60 and 62 of the side walls 52 and 54 to the back wall 56 is generally equal to the front to back dimension of a column of packages. Further, the package column slide structure 42 is attached to the movable package column pusher 32 for movement with the pusher by means of, for example, a hanger 72 at the back wall 56 of the slide structure 42. The hanger 72 is shown as being attached to the slide structure back wall 56 at the top edge thereof. The hanger 72 is in the form of a downwardly projecting lip spaced from the slide structure back wall 56 by a distance generally equal to the thickness of the pusher back plate 33. The hanger 72 slides over the top edge of the pusher back plate 33 so that the package slide structure 42 is suspended therefrom. The slide structure 42 also includes a stop means illustrated as a stop flange 74 attached to the one side wall, for example, side wall 54 which is adjacent the spacer panel 40. The stop flange 74 is shown as being located proximate the intersection of the slide structure back wall 56 and slide structure side wall 54 and projecting outwardly of the side wall 54. The stop flange 74 is sized and adapted to abut the vertical rear edge of the spacer panel 40 when the column pusher 32 has moved the near most column of cigarette packages into position at the open front 18 of the support housing.

The foregoing detailed description is given primarily for clearness of understanding and no unnecessary limitations are to be understood therefrom for modifications will become obvious to those skilled in the art upon reading this disclosure and can be made without departing from the spirit of the invention and scope of the appended claims.

What is claimed is:

1. In a cigarette package dispensing machine of the type having a package column support housing for supporting two adjacent front to back ranks of columns of stacked cigarette packages of a predetermined size, the column support housing including two spaced, parallel side walls, a back wall generally perpendicular to and interconnecting the side walls, an open front defined by the front free edges of the side walls opposite the back wall, and an open bottom through which packages exit the column support housing one at a time, a movable package column pusher plate located within the support housing generally coextensive with and parallel to the housing back wall and mounted for movement from the housing back wall toward the open front of the housing, and means for biasing the movable pusher plate in a direction away from the housing back wall toward the open front of the housing, the improvement of a device for adapting the column support housing to support packages of a smaller size than the predetermined package size, comprising:

a spacer panel adapted to be located in generally parallel, spaced relationship to a portion of one side wall of the column support housing, the spacer panel extending vertically substantially the entire height of the housing side wall and extending horizontally from the free front edge of the housing side wall toward the housing back wall a distance substantially corresponding to the front to back dimension of a column of packages to be supported in the housing, terminating at a back edge, and the distance by which the spacer panel is to be spaced from the housing side wall being substantially equal to the difference in width of the package of predetermined size and the package of smaller size, the spacer panel including a spacing flange formed at the vertical front edge of the spacer panel immediately at the vertical free front edge of the support structure side wall holding the spacer panel away from the support structure side wall;

an elongate bracket attached at one of its ends to the spacer panel and attached at its other end to the housing side wall for attaching the spacer panel in a fixed position to the column support housing;

a package column slide structure adapted to be slidably received in the support housing, the slide structure having two spaced apart, parallel side walls, a back wall perpendicular to the parallel side walls and interconnecting the side walls, an open front defined by the free edges of the side walls opposite the back wall, and an open bottom defined by the bottom edges of the side walls and bottom edge of the back wall, the width of the slide structure between the side walls being less than the width of the column support housing between the housing side walls, and one side being adjacently positioned in parallel relationship to the housing side wall having the spacer panel, the slide structure side wall being spaced from the adjacent housing side wall by a distance greater than the distance by which the spacer panel is spaced from the same housing side wall, and the back wall being located in parallel overlaying relationship to the pusher plate;

a hanger associated with the back wall of the slide structure at the top edge of the back wall forming a downwardly projecting lip spaced from the back wall of the slide structure by a distance equal to the thickness of the pusher plate receiving therein the top edge of the pusher plate for attaching the package column slide structure to the pusher plate so that the package column slide structure moves with the pusher plate; and, a stop flange projecting from the slide structure side wall adjacent the housing side wall having the spacer panel toward the adjacent housing side wall for abutting the back edge of the spacer panel for stopping movement of the column slide structure at a predetermined position between the column support housing back wall and open front of the column support housing.

* * * * *